(12) United States Patent
Shoji et al.

(10) Patent No.: US 6,511,523 B2
(45) Date of Patent: Jan. 28, 2003

(54) PLATINUM MATERIAL REINFORCED BY OXIDE-DISPERSION AND PROCESS FOR PRODUCING THE SAME

(75) Inventors: Toru Shoji, Kanagawa (JP); Soichi Hitomi, Kanagawa (JP); Yoshikazu Takagi, Kanagawa (JP); Yoshinobu Watanabe, Kanagawa (JP)

(73) Assignee: Tanaka Kikinzoku Kogyo K.K., Tokyo (JP)

( * ) Notice: Subject to any disclaimer, the term of this patent is extended or adjusted under 35 U.S.C. 154(b) by 47 days.

(21) Appl. No.: 10/049,625

(22) PCT Filed: Jun. 15, 2001

(86) PCT No.: PCT/JP01/05128
§ 371 (c)(1),
(2), (4) Date: Feb. 22, 2002

(87) PCT Pub. No.: WO02/00952
PCT Pub. Date: Jan. 3, 2002

(65) Prior Publication Data
US 2002/0112563 A1 Aug. 22, 2002

(30) Foreign Application Priority Data
Jun. 28, 2000 (JP) ......................................... 2000-194012

(51) Int. Cl.$^7$ .............................. C22C 5/04; B22F 3/12; B22F 3/17
(52) U.S. Cl. .............................. 75/235; 419/19; 419/28; 419/29
(58) Field of Search .............................. 75/235; 419/19, 419/28, 29

(56) References Cited

U.S. PATENT DOCUMENTS

| 3,366,515 A | * | 1/1968 | Fraser et al. ................. 148/514 |
| 3,622,310 A | * | 11/1971 | Reinacher et al. .......... 148/513 |
| 3,709,667 A | | 1/1973 | Selman et al. ............. 29/182.5 |
| 4,002,503 A | * | 1/1977 | Bourne et al. .............. 148/514 |
| 4,077,816 A | * | 3/1978 | Nadkarni ...................... 419/19 |
| 4,252,558 A | * | 2/1981 | Touboul et al. ............. 148/430 |
| 4,819,859 A | * | 4/1989 | Schwenninger .......... 228/173.6 |
| 5,730,931 A | * | 3/1998 | Poniatowski et al. ....... 420/466 |

FOREIGN PATENT DOCUMENTS

| EP | 365367 A | 4/1990 |
| EP | 960674 A | 12/1999 |
| JP | 2001-158952 A | 6/2001 |

* cited by examiner

*Primary Examiner*—Ngoclan Mai
(74) *Attorney, Agent, or Firm*—Arent Fox Kintner Plotkin & Kahn PLLC

(57) ABSTRACT

The present invention is aimed at providing a platinum material in which creep strength is elevated by improving a metal grain shape in an oxide-dispersion strengthened platinum material in which zirconium oxide is dispersed, and providing a process for producing the platinum material.

The present invention provides an oxide-dispersion strengthened platinum material in which zirconium oxide is dispersed in platinum and which can be obtained through rolling and thermal recrystallization, in which platinum grains constituting the platinum material have an average grain size in a rolling direction in the range of 200 to 1500 µm and an average grain aspect ratio of 20 or more.

10 Claims, 3 Drawing Sheets

← 0.2mm →

← 0.2mm →

← 0.2mm →

PLATINUM MATERIAL REINFORCED BY OXIDE-DISPERSION AND PROCESS FOR PRODUCING THE SAME

TECHNICAL FIELD

The present invention relates to an oxide-dispersion strengthened platinum material in which zirconium oxide is finely dispersed in platinum. In particular, it relates to an oxide-dispersion strengthened platinum material that consists of coarse platinum grains and to its production process.

BACKGROUND ART

A platinum material exhibiting good high-temperature strength has been used mainly as a structural material for glass melting for a long time. High-temperature strength required to the platinum material is so-called creep strength. In particular, the most important objective in developing a platinum material is considered to be how long a durable time until creep rupture will be extended.

For improving creep strength, there has been conventionally used a technique that a particular oxide is finely dispersed in platinum. As such an oxide-dispersion strengthened platinum material, a material in which zirconium oxide is dispersed in platinum is known.

However, zirconium-oxide dispersion strengthened platinum material that has been conventionally known can ensure a certain level of creep strength, but is in the present state that the creep strength is required to be improved further.

DISCLOSURE OF THE INVENTION

Accordingly, the present invention is aimed at providing a platinum material in which creep strength is more improved than that in conventional materials by improving a metal grain shape in a conventionally known oxide-dispersion strengthened platinum material in which zirconium oxide is dispersed, and providing a process for producing the platinum material.

In order to solve the above problems, the inventors of the present invention paid their attentions to the fact that creep strength depends on the metal grain of a platinum material, that is, the size of a platinum grain and have completed a technique for further improving the creep strength by making crystal grains in a platinum material to be finished as a final product more coarse than those in the conventional product.

That is, the present invention is characterized in that in an oxide-dispersion strengthened platinum material in which zirconium oxide is dispersed in platinum and which is obtained through rolling and thermal recrystallization, platinum grains that constitute the platinum material have an average grain size in a rolling direction ranging from 200 to 1500 $\mu$m and have an average grain aspect ratio of 20 or more.

Because a platinum material in the present invention is an oxide-dispersion strengthened material in which zirconium oxide is dispersed in platinum and which is obtained through thermal recrystallization after rolling, if being considered liken to a plate material, platinum grains in the platinum material texture are in a state of being stretched in a direction of a plate surface, that is, in a state of being extended in a longitudinal direction. That is, the platinum grains constituting a platinum material of the present invention are those in which the average grain size in the rolling direction, that is, in the plate thickness direction is in the range of 200 to 1500 $\mu$m and the crystal grain aspect ratio, that is, the ratio of the crystal size in the plate surface direction to the crystal size in the plate thickness direction is 20 or more. As long as the inventors of the present invention know, there is no platinum material that is composed of such coarse platinum grains in conventional zirconium-oxide dispersion strengthened platinum materials.

According to the platinum material of the present invention, the creep strength is further improved compared to that in conventional platinum materials, and even when the material is used as a structural material for glass melting, the material can decrease the amount of platinum eluted into molten glass. Generally, because spots where creep rupture and an elution phenomenon of a platinum material occur are considered to be caused mainly by grain boundaries, the reason why the platinum material of the present invention can achieve the improvement of creep strength and the decrease in the elution phenomenon of platinum is considered that the number of grain boundaries themselves is extremely few in the material because platinum grains constituting the platinum material are coarse.

An oxide-dispersion strengthened platinum material according to the present invention can be obtained by the following production process. That is a process for producing an oxide-dispersion strengthened platinum material where zirconium oxide is finely dispersed in platinum, comprising the steps of pouring powdered platinum into water to prepare a platinum suspension; adding a zirconium nitrate solution and a pH adjusting liquid in the platinum suspension for adjusting the suspension to a given pH to precipitate zirconium hydroxide and thus to form zirconium hydroxide carrying platinum; collecting the zirconium hydroxide carrying platinum, which is then cold isostatic pressed into a molding; sintering and forging the molding under the conditions in which secondary recrystallization growth in a platinum grain is restrained, to form a platinum ingot; and cold-rolling the platinum ingot in a reduction ratio of 70% or more and then thermally recrystallizing the product.

A production process according to the present invention is characterized in that first, a given powdered platinum is prepared and then a zirconium-hydroxide carrying platinum in which zirconium hydroxide is supported is formed with the use of a chemical precipitation reaction. And in the process, using the powder of this zirconium hydroxide carrying platinum, forming, sintering, forging, cold rolling and thermally recrystallizing are sequentially conducted, but the process is characterized in that sintering and forging among these processes are conducted under the conditions whereby the secondary recrystallization growth of platinum is restrained to the utmost. In the following, a production process according to the present invention will be detailed one by one.

First, in contrast to so-called coprecipitation (a coprecipitation process), in a production process of the present invention, platinum is first processed into given powders; the powdered platinum is used to prepare a platinum suspension; a zirconium nitrate solution and a pH adjusting liquid are added for adjusting the suspension to a given pH to precipitate zirconium hydroxide and thus to form zirconium-hydroxide carrying platinum; and the zirconium-hydroxide carrying platinum is collected and is then cold isostatic pressed into a molding.

When a zirconium-hydroxide carrying platinum is formed by such a process, platinum alone is powdered in advance.

Thus, platinum powders may be appropriately prepared as those having a particle size suitable for subsequent molding and sintering steps. In general, powdered platinum exhibits quite higher gas adsorption ability. However, according to the production process of the present invention, gas adsorption on a platinum surface may be reduced due to the presence of zirconium hydroxide supported on the platinum surface, so that the formation of unwanted pores due to adsorbed gas, which becomes an issue during molding and sintering, i.e., the formation of internal defects in the platinum material to be finally obtained, can be effectively prevented.

Further, it is preferable in the production process of the present invention to use heated powdery platinum when forming a zirconium-hydroxide carrying platinum. The heating process is conducted at temperatures of 400° C. or higher. Such heating may considerably inhibit pore formation due to adsorbed gas during the subsequent molding and sintering processes. And, after the heating process, the surface of the powdered platinum becomes smooth, so that zirconium hydroxide can be homogeneously and finely supported by each platinum surface and thus zirconium oxide can be quite homogeneously and finely dispersed in a platinum material. This heating process may be conducted during or after the powdering process.

And when a zirconium-hydroxide carrying platinum is formed according to the production process of the present invention, a pH adjusting liquid added together with zirconium nitrate is sufficient if it has such character as to raise pH value. Because when pH of the mixed solution of a platinum suspension and a zirconium nitrate solution is raised, the zirconium nitrate changes to zirconium hydroxide to precipitate, and the precipitated zirconium hydroxide is supported on the surface of platinum. As a pH adjusting liquid, it is preferable to use any solution of ammonia, sodium hydroxide, calcium hydroxide and potassium hydroxide, or to use a urea solution.

When any solution of ammonia, sodium hydroxide, calcium hydroxide and potassium hydroxide is used as a pH adjusting liquid, it is preferable that a zirconium nitrate solution is added to a platinum suspension and the mixture is stirred, and then the pH of the mixture is adjusted while adding a pH adjusting liquid, including ammonia. When any of these pH adjusting liquids is used, a chemical precipitation reaction is caused without any need of especially raising the temperature of the solution.

Moreover, if a urea solution is used as a pH adjusting liquid, it is preferable that after a zirconium nitrate solution is added to a platinum suspension and the mixture is heated at the boiling temperature with stirring, a urea solution is added to adjust the pH of the mixture and then heating is stopped. In case of a urea solution, if the temperature of the mixture is too low, hydrolysis of urea is very slow, so that the nucleus growth of zirconium hydroxide may preferentially proceed while the nucleation little occurs. The mixture is, therefore, heated at the boiling temperature for promoting the nucleation of zirconium hydroxide and maximizing the nucleus growth rate.

And, pH adjusting with the above described pH adjusting liquid is preferably conducted so that the mixture is in the range of pH 4.5 to 11.0, more preferably pH 6.0 to 8.0 at the end of the chemical precipitation reaction. If it is less than pH 4.5, zirconium hydroxide is not formed, while if more than pH 11.0, carrying of zirconium hydroxide on a platinum surface may be interfered.

Moreover, in a process for producing an oxide-dispersion strengthened platinum according to the present invention, the particle size of platinum used for preparing a platinum suspension, i.e., platinum powder prepared by being powdered in advance, is preferably in the range of 0.05 to 10 $\mu$m. Because platinum powders with the particle size of less than 0.05 $\mu$m cannot be readily prepared and may tend to form a bridge by agglomeration. And if the particle size is more than 10 $\mu$m, moldability in cold isostatic pressing may be deteriorated while zirconium hydroxide supported on each platinum powder surface may be poorly dispersed, leading to uneven secondary recrystallization growth during the final thermal recrystallization step. Thus, the use of platinum powders with a particle size in the range of 0.05 to 10 $\mu$m may allow zirconium hydroxide to be evenly dispersed and supported on individual platinum particle surfaces. And when molding, sintering and forging are conducted using this zirconium-hydroxide carrying platinum in which zirconium hydroxide is evenly dispersed and supported, zirconium oxide will be evenly and finely dispersed in a platinum ingot. The zirconium oxide finely dispersed in a platinum ingot may suitably function as an inhibitor for controlling secondary recrystallization growth during the final thermal recrystallization step while it becomes a factor to improve creep strength of the platinum material.

The zirconium-hydroxide carrying platinum obtained by the above chemical precipitation method is collected by, for example, filtration and is then subjected to appropriate drying. And, in the production process of the present invention, cold isostatic pressing, sintering and forging are sequentially conducted using the collected zirconium-hydroxide carrying platinum. The steps of sintering and forging are conducted under the conditions whereby the secondary recrystallization growth of platinum is restrained to the utmost, as described above.

Secondary recrystallization refers to recrystallization of a small number of coarse crystal grains, which is driven by crystal grain boundary energy. In a process for producing an oxide-dispersion strengthened platinum material according to the present invention, first, cold isostatic pressing is conducted so as not to cause this secondary recrystallization when zirconium-hydroxide carrying platinum is formed.

In the studies by the inventors of the present invention, it has been ascertained that in the case where uniaxial compression molding, so-called mold pressing that is general as a fabrication method in powder metallurgy is used, secondary recrystallization growth occurs even if conditions of sintering temperature and forging temperature are modified when sintering and forging are conducted later. It is presumed that in case of mold pressing, because unevenness is easily induced in the platinum density distribution and internal stress in a molding, the unevenness may lead to secondary recrystallization growth. On the other hand, in the case where cold isostatic pressing is used, as long as subsequent sintering and forging are conducted under given temperature conditions, secondary recrystallization growth does not proceed before thermal recrystallization to be conducted finally.

There are no specific restrictions to the conditions of the cold isostatic pressing in this case, but it is preferable that collected zirconium-hydroxide carrying platinum is filled in a rubber mold, which is then molded at a molding pressure of 40 to 200 MPa (about 408 to 2040 kg/cm $^2$). Because if a molding pressure is less than 40 MPa, the material cannot be compressed into a molding with a given shape, so that grain growth by sintering cannot adequately proceed, and if a molding pressure is more than 200 MPa, secondary recrystallization growth tends to be caused by the change in particle. shapes.

And, after forming the molding by cold isostatic pressing, it is sintered and forged under the conditions whereby secondary recrystallization growth is restrained. By the sintering step, zirconium hydroxide in the molding is converted into zirconium oxide. In a production process of the present invention, collected zirconium-hydroxide carrying platinum is formed into a molding and is then sintered while converting zirconium hydroxide into zirconium oxide. Alternately, the collected zirconium-hydroxide carrying platinum may be sintered in advance to be converted into a zirconium-oxide carrying platinum, which is then used as a molding.

A sintering temperature in the sintering step is preferably 1000 to 1250° C. The reason why a sintering temperature is made to be in the range of 1000 to 1250° C. is that sintering at more than 1250° C. tends to cause the secondary recrystallization growth of platinum grains, so that a platinum material comprising of coarse platinum grains according to the present invention cannot be obtained in thermal recrystallization to be conducted at the end, while at less than 1000° C., binding between platinum particles by sintering or grain growth may be inadequate. There are no restrictions to an atmosphere during sintering.

And, it is preferable to conduct forging after heating to 1100 to 1250° C. The heating temperature range of 1100 to 1250° C. during forging is selected because at more than 1250° C., similarly to the case of sintering temperature, the secondary recrystallization growth of platinum grains tends to be caused, so that a platinum material comprising of coarse platinum grains according to the present invention cannot be obtained in thermal recrystallization to be conducted at the end, while at less than 1100° C., cracks tend to be generated during forging. For forging, a processing procedure is not specially limited, but forging by striking with an air hammer is preferable because the material is heated to an elevated temperature.

After forming a platinum ingot by molding, sintering and forging as described above, the ingot undergoes thermal recrystallization by cold rolling under the condition of a reduction ratio of 70% or more, preferably 90% or more. Because of properties of the platinum material, if thermal recrystallization is conducted at temperatures of less than 1200° C., recrystallization tends to inadequately proceed. Thus, it is preferably conducted at temperatures of 1200° C. or higher, and an optimal temperature for thermal recrystallization may be appropriately determined, depending on a reduction ratio or the like during cold rolling. After internal strain is loaded to platinum ingot by conducting such cold rolling in the reduction ratio of 70% or more, thermal recrystallization treatment can make secondary recrystallization growth proceed remarkably, resulting in producing an oxide-dispersion strengthened platinum material according to the present invention, that is, a platinum material comprising of coarse platinum grains that have the average grain size in the rolling direction ranging from 200 to 1500 $\mu$m and the average grain aspect ratio of 20 or more.

BEST MODE FOR CARRYING OUT THE INVENTION

Figure 1:
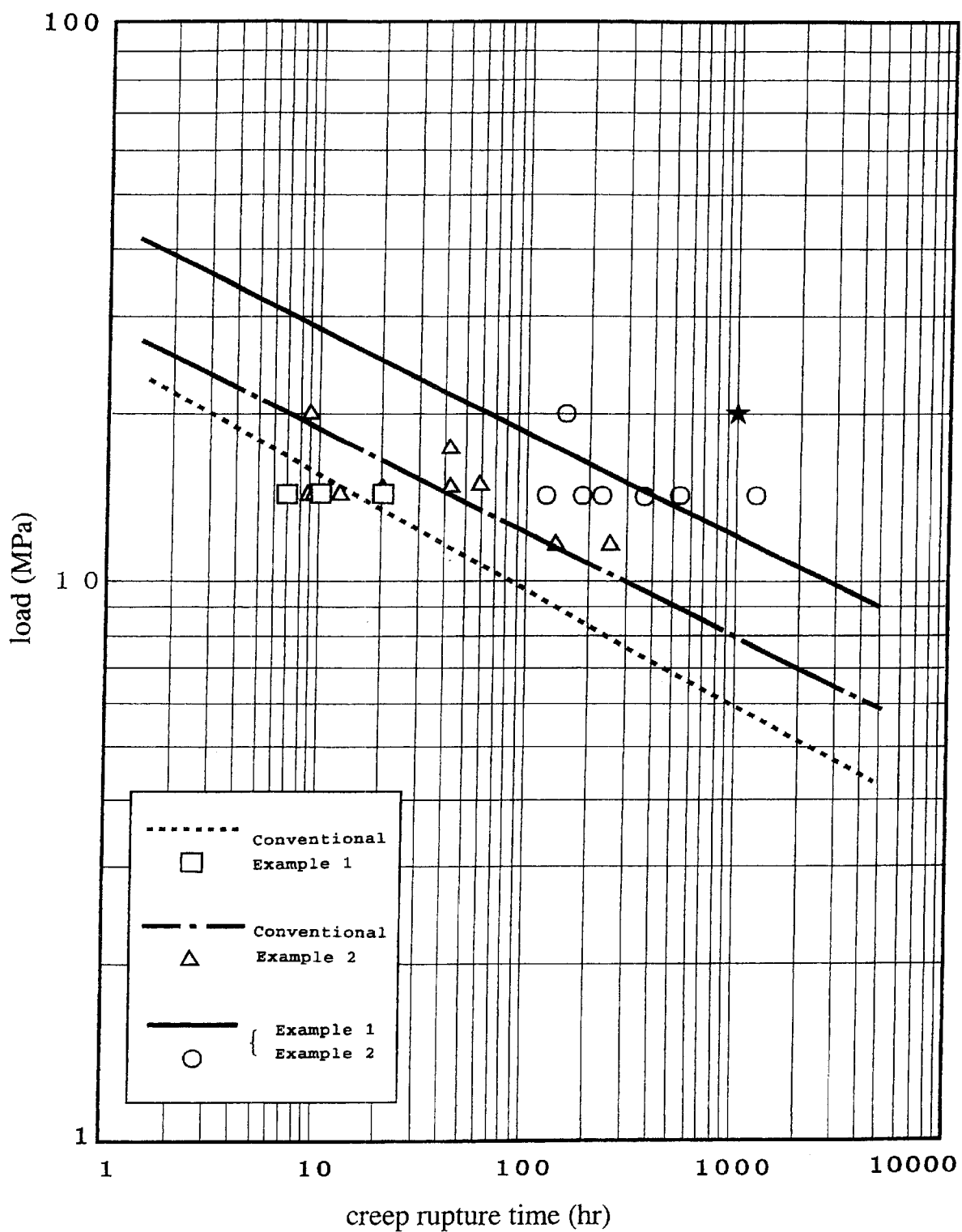
FIG. 1 is a graph showing the measurement results of creep strength.

An embodiment of the present invention will be described with reference to the following Examples and Conventional Examples.

EXAMPLE 1

This Example 1 will describe a case where zirconium-hydroxide carrying platinum is formed using Pt powders with a particle size of about 0.6 $\mu$m as Pt (platinum) powdered in advance and ammonia as a pH adjusting liquid and thus a platinum material is produced. The powdered Pt used herein is prepared as follows: a suspension in which powdered Pt (the specific surface area of about 23 m$^2$/g) and CaCO$_3$ are mixed is ball-milled, and the suspension is then heat-treated at an elevated temperature of 1100° C., after that the mass obtained by the heat-treating is poured into water and treated with nitric acid.

First, 2 kg of the above described powdered Pt was poured into 3.5 kg of pure water to prepare a platinum suspension. And, 9.12 g of Zr(NO$_3$)$_4$ solution (the concentration is 96.66%) was mixed in the platinum suspension. After the mixed solution was stirred at ordinary temperature for about 3 minutes, 2.0 g of ammonia solution (the concentration is 29%) was added to the mixed solution to adjust the solution to pH 7.5.

This pH adjusting caused the conversion of Zr(NO$_3$)$_4$ in the mixed solution into Zr(OH)$_4$, which was precipitated. The Zr(OH)$_4$ precipitated became in the state of being carried by platinum particles in the mixed solution, resulting in providing zirconium-hydroxide carrying platinum.

Then, the mixed solution was filtered to collect zirconium-hydroxide carrying platinum. The collected zirconium-hydroxide carrying platinum was, after washing, dried at 120° C. in an ambient atmosphere.

Subsequently, the zirconium-hydroxide carrying platinum was passed through a 300 $\mu$m sieve. After being passed through the 300 $\mu$m sieve, the zirconium-hydroxide carrying platinum was filled in a rubber mold, which was subjected to cold isostatic pressing (CIP) under a hydrostatic pressure of 98.1 MPa (about 1000 kg/cm$^2$) to provide a molding with a predetermined shape.

Next, the molding obtained by CIP treatment was sintered at 1200° C. for about 1 hour in an ambient atmosphere. While heating at 1200° C., the sintered molding was forged with an air hammer to form a platinum ingot.

After that, the platinum ingot was subjected to cold rolling so as to attain a reduction ratio of 90%. Subsequently, the ingot was subjected to thermal recrystallization at 1400° C. for 1 hour to form a given platinum material. Analysis of the platinum material in this Example 1 made it clear that Zro$_2$ was dispersed in the platinum material in about 0.12%.

EXAMPLE 2

This Example 2 shows a case where the same Pt powders as those in Example 1 and a urea solution as a pH adjusting liquid are used to form zirconium-oxide carrying platinum, from which a platinum material is produced.

One kg of powdered Pt was poured into 1.5 kg of pure water to prepare a platinum suspension. Then, 4.56 g of Zr(NO$_3$)$_4$ solution (the concentration is 96.66%) was mixed in the platinum suspension, and the mixed solution was heated up to boiling temperature with stirring. After that, an aqueous solution in which 4.0 g of urea had been dissolved was added to adjust the mixed solution to pH 7.0 and the heat treatment was stopped.

This pH adjusting caused the conversion of $Zr(NO_3)_4$ in the mixed solution into $Zr(OH)_4$, which was precipitated. The $Zr(OH)_4$ precipitated was carried by platinum particles in the mixed solution, resulting in providing zirconium-hydroxide carrying platinum.

Then, the mixed solution was filtered to collect zirconium-hydroxide platinum. The collected zirconium-hydroxide carrying platinum was, after washing, dried at 120°C. in an ambient atmosphere.

In this Example 2, since the production conditions after collecting the zirconium-hydroxide carrying platinum are the same as those in Example 1 described above, the detail will be omitted. Analysis of the platinum material obtained in this Example 2 made it clear that $ZrO_2$ was dispersed in the platinum material in about 0.12%.

Conventional Example 1

This Conventional Example 1 describes a case where zirconium is added to platinum to form a platinum alloy, which is then melt-sprayed with a flame gun or the like into water to form platinum powders, i.e., the preparation of a platinum material by forming platinum powders using the so-called flame spraying.

In the production process of this Conventional Example 1, first, a platinum ingot containing a given amount of zirconium was formed by the vacuum melting method and was forged. The platinum ingot was then subjected to grooved rolling for wire drawing.

The wire-drawn article was melt-sprayed into a distilled water bath using a flame gun to form platinum-alloy powders. The platinum-alloy powders thus formed were oxidized at 1250° C. for 24 hours in an ambient atmosphere. The oxidized platinum-alloy powders were compacted into a given shape using mold pressing and then sintered at 1250° C. for 1 hour. The molding thus formed was shaped using an air hammer, cold-rolled in a reduction ratio of 90% and was subjected to thermal recrystallization at 1400° C. for 1 hour to provide a platinum material of this Conventional Example 1. In the platinum material obtained in Conventional Example 1, $ZrO_2$ was dispersed in about 0.16%.

Conventional Example 2

This Conventional Example 2 shows a case where platinum powders are formed in the state of zirconium oxide carried on platinum by the so-called coprecipitation method and the platinum powders are used to prepare a platinum material. In this Conventional Example 2, a hexachloroplatinic acid solution and a zirconium nitrate solution were mixed. To the resulting solution were added hydrazine hydrate as a reducing agent and calcium hydroxide for adjusting pH to cause coprecipitation and thus to provide $Pt-Zr(OH)_4$. Then, the product was filtered, dried and sintered to form zirconium-oxide carrying platinum powders.

A graphite crucible was charged with the platinum powders prepared by the coprecipitation technique. After vibrating the crucible by tapping for 1 to 2 minutes, it was heated to 800° C. over about 6 hours under an argon gas atmosphere as the first sintering step. Then, the crucible was kept at 800° C. for 2 hours. And at the end of the first sintering step, the sintered compact was turned upside-down and then on a ceramic holder was subjected to the second sintering. During the second sintering, the crucible was heated to 1600° C. over about 4 hours and kept at the temperature for 3 hours.

At the end of the second sintering, the sintered compact was further forged under an argon gas atmosphere to be processed such that a density of the sintered compact became about 90% of the theoretical density. The forged product was annealed at 1000° C. for 20 minutes under an ambient atmosphere and cold-rolled to provide a platinum material of this Conventional Example 2. In the platinum material obtained in this Conventional Example 2, $ZrO_2$ was dispersed in about 0.1.6%.

Figure 2:
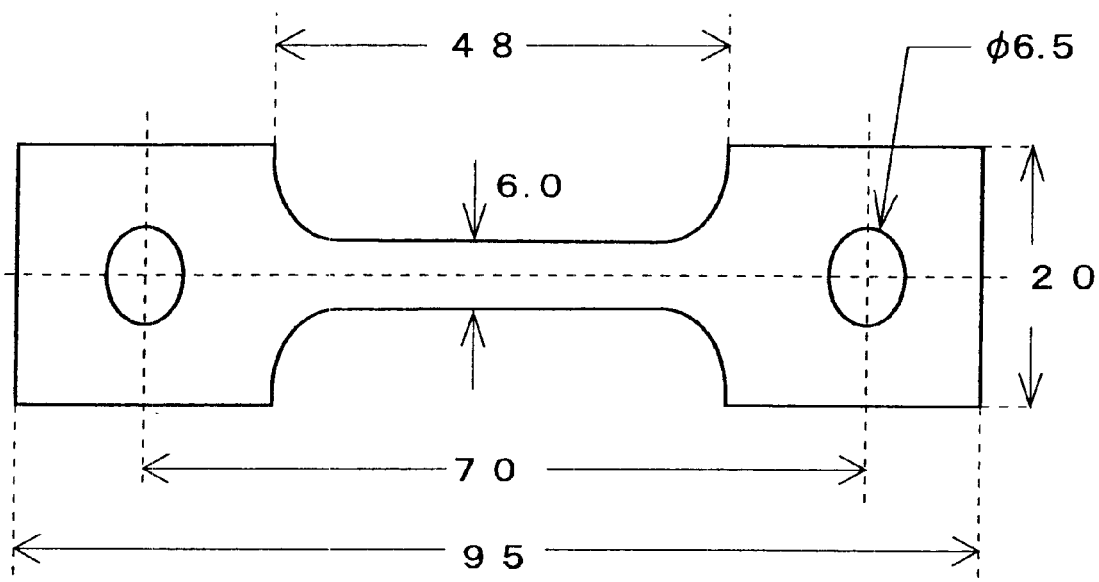
FIG. 2 is a schematic plan view of a specimen used in measuring creep strength.

Here, the platinum materials from the above Examples 1 and 2 and Conventional Examples 1 and 2 were evaluated for their high-temperature creep property, whose results will be described. FIG. 1 shows a graph of the results of measurement of creep strength for individual platinum materials. Creep strength test was conducted by preparing a specimen shown in FIG. 2 (thickness is 1.0 mm, values in FIG. 2 are in mm) from the platinum materials of Examples and Conventional Examples and determining a creep rupture time when specimens were left at 1400° C. while varying a load applied to the samples.

In the graph in FIG. 1, concerning Conventional Examples 1 and 2, straight lines extrapolated from creep rupture times determined under individual loads of 12, 15, 18 and 20 MPa are given as creep strength straight lines, and typical measurement results (mark □ is for Conventional Example 1, and mark Δ is for Conventional Example 2) are also indicated. The broken line indicates the results of Conventional Example 1, and the single-dot chain line indicates the results of Conventional Example 2.

Concerning Examples 1 and 2, the results measured under loads of 20 MPa and 15 MPa are plotted. Plots of mark ○ in FIG. 1 indicate the measurement results for platinum materials obtained in Examples 1 and 2. And an extrapolated straight line from this measurement results for creep strength in Example 1 and 2 is given in full line.

As seen in this FIG. 1, it has become clear that platinum materials in Examples 1 and 2 have obviously improved. creep rupture lives as compared to those obtained in Conventional Examples 1 and 2. And although there are scatters in the measurement results, according to the production process in Examples 1 and 2, in the case where a load is 15 MPa, it has become clear that the creep rupture life is extended to about four times as long as that in the material obtained in Conventional Examples.

Further, the measurement result indicated by mark ★ in FIG. 1 is for a platinum material cold-rolled in a reduction ratio of 97% in the production process according to Example 1 (all the conditions are the same as those in Example 1, except for a reduction ratio in cold-rolling). As seen in the result, even in case of a reduction ratio of 97% in cold-rolling, it has become clear that the creep rupture life can be obviously extended compared to those in Conventional Examples 1 and 2.

Figure 3:
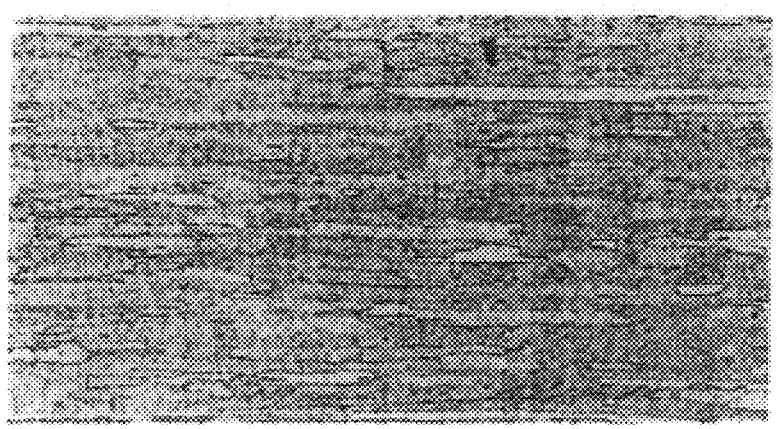
FIG. 3 is a metallographic cross-section of the platinum material in Conventional Example 1.
Figure 4:
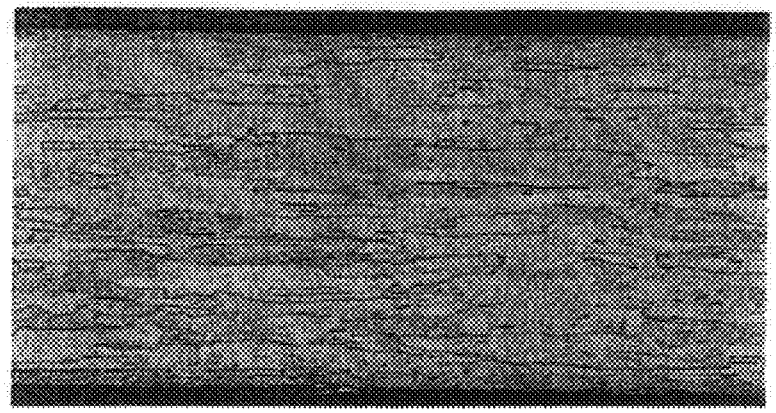
FIG. 4 is a metallographic cross-section of the platinum material in Conventional Example 2.
Figure 5:
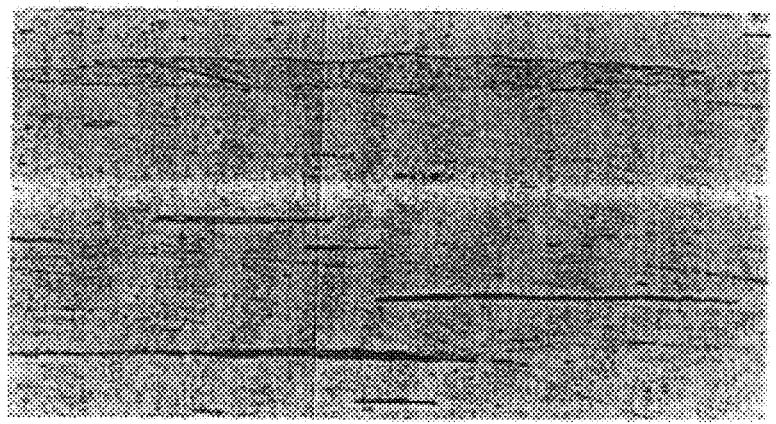
FIG. 5 is a metallographic cross-section of the platinum material in Example 1.

Next, the results of observation of a metal structure for the platinum material prepared in Example 1 will be described. FIGS. 3 and 4 show a metallographic cross-section of the platinum materials in Conventional Example 1 and Conventional Example 2, respectively, and FIG. 5 shows that of the material in Example 1. All of these photographs are metallographic microscopy results for cross-sectional structures after the platinum materials are cold-rolled. in a reduction ratio of 90% and then subjected to thermal recrystallization at 1400° C. for 1 hour (magnification: 100). More, the vertical direction to the front of the figures is the plate thickness direction (rolling direction).

As a result of comparing the states of the metal structures seen in this FIGS. 3 and 4 with that seen in FIG. 4, it was confirmed that platinum grains in the metal structure in the present Example 1 are obviously very coarse.

When the cross-sectional structures of the platinum materials in Conventional Examples 1 and 2 were observed at several spots and the average grain sizes in the plate thickness direction (rolling direction) in individual platinum materials were determined, the size was about 30 to 120 μm for Example 1 and about 60 to 150 μm for Example 2. Moreover, when the values of the average grain aspect ratio were calculated for the individual materials, the value was about 10 to 15 for Conventional Example 1 and about 12 to 18 for Conventional Example 2.

Similarly, the cross-sectional observation of the platinum material in Example 1 was conducted at several spots and the determination of the average grain size was tried in the plate direction (rolling direction). As seen in the photograph of cross-sectional structure in FIG. 4, however, platinum grains (parts in slenderly extending states in the right and left direction in FIG. 4.) can be confirmed locally, but there were such large grains that their sizes could not be determined in the photograph for the cross-sectional observation. Moreover, among several spots where cross-sectional observations were conducted, there were found parts where no grain boundary of platinum can be confirmed, that is, only one platinum grain is considered to occupy in the plate thickness direction. Accordingly, from photographs of cross-sectional structures in several spots, the average grain size in the plate thickness direction for Example 1 was estimated to be 200 μm at the lowest. Furthermore, the maximum value of the average grain size was considered to be the same degree as the plate thickness, i.e., about 1500 μm, because there was also found such apart that only one platinum grain occupied in the plate thickness direction.

And the calculation. of the average grain aspect ratio was also tried, because there were such platinum grains that their sizes could not be confirmed in the plate thickness direction and the plate surface direction in the photograph of the cross-sectional structure in Example 1 as described above, it was difficult to calculate the aspect ratio directly similarly to those for Conventional Examples. Accordingly, in consideration of the lowest average grain size of 200 μm in the plate thickness direction for Example 1 and the photographs of cross-sectional observations and the individual average grain aspect ratios for Conventional Examples 1 and 2, the average grain aspect ratio for this Example 1 was estimated to be 20 or more.

INDUSTRIAL APPLICABILITY

According to the present invention, a platinum material having more excellent high-temperature strength than that in a conventional material can be provided as a oxide-dispersion strengthened platinum material in which zirconium oxide is dispersed, which makes it possible to produce a material highly suitable as a structural material for glass melting.

What is claimed is:

1. An oxide-dispersion strengthened platinum material in which zirconium oxide is dispersed in platinum and which can be obtained through rolling and thermal recrystallization, wherein platinum grains constituting the platinum material have an average grain size in a rolling direction in a range of 200 to 1500 μm and an average grain aspect ratio of 20 or more.

2. A process for producing an oxide-dispersion strengthened platinum material in which zirconium oxide is finely dispersed in platinum, comprising pouring powdered platinum into water to prepare a platinum suspension;

mixing a zirconium nitrate solution and a pH adjusting liquid into the platinum suspension to adjust the pH of the suspension to precipitation zirconium hydroxide and thus to form a zirconium hydroxide carrying platinum;

collecting the zirconium hydroxide carrying platinum and then cold isostatic pressing the zirconium hydroxide carrying platinum into a molding;

sintering and forging the molding under the conditions in which secondary recrystallization growth in a platinum grain is restrained, to form a platinum ingot; and cold-rolling the platinum ingot in a reduction ratio of 70% or more and then thermally recrystallizing the product.

3. The process for producing an oxide-dispersion strengthened platinum material according to claim 2, further comprising thermally treating the powdered platinum.

4. The process for producing an oxide-dispersion strengthened platinum material according to claim 2, wherein the pH adjusting liquid is any solution of ammonia, sodium hydroxide, calcium hydroxide or potassium hydroxide; and further comprising adding a zirconium nitrate solution to the platinum suspension with stirring; and adding the pH adjusting liquid to the suspension.

5. The process for producing an oxide-dispersion strengthened platinum material according to claim 2, wherein the pH adjusting liquid is a urea solution; and further comprising adding a zirconium nitrate solution to the platinum suspension; heating the suspension up to a boiling temperature with stirring; adding the pH adjusting liquid to the suspension; and then stopping heating.

6. The process for producing an oxide-dispersion strengthened platinum material according to claim 2, wherein the pH is adjusted to a range of 4.5 to 11.0.

7. The process for producing an oxide-dispersion strengthened platinum material according to claim 2, wherein the platinum used for preparing the platinum suspension is powder with a particle size of 0.05 to 10 μm.

8. The process for producing an oxide-dispersion strengthened platinum material according to claim 2, wherein the molding pressure in the cold isostatic pressing is 40 to 200 MPa.

9. The process for producing an oxide-dispersion strengthened platinum material according to claim 2, wherein the sintering is conducted at 1000 to 1250° C.

10. The process for producing an oxide-dispersion strengthened platinum material according to claim 2, wherein the forging is conducted after heating at 1100 to 1250° C.

* * * * *

UNITED STATES PATENT AND TRADEMARK OFFICE
CERTIFICATE OF CORRECTION

PATENT NO.    : 6,511,523 B2
DATED         : January 28, 2003
INVENTOR(S)   : Toru Shoji et al.

It is certified that error appears in the above-identified patent and that said Letters Patent is hereby corrected as shown below:

<u>Title page,</u>
Item [*] Notice, change "by 47 days" to -- by 0 days --.

Signed and Sealed this

Twenty-eighth Day of October, 2003

JAMES E. ROGAN
*Director of the United States Patent and Trademark Office*